Feb. 27, 1968  J. H. CARPENTER  3,370,703
HIGH TENSION SEPARATOR
Original Filed Jan. 7, 1964  9 Sheets-Sheet 6
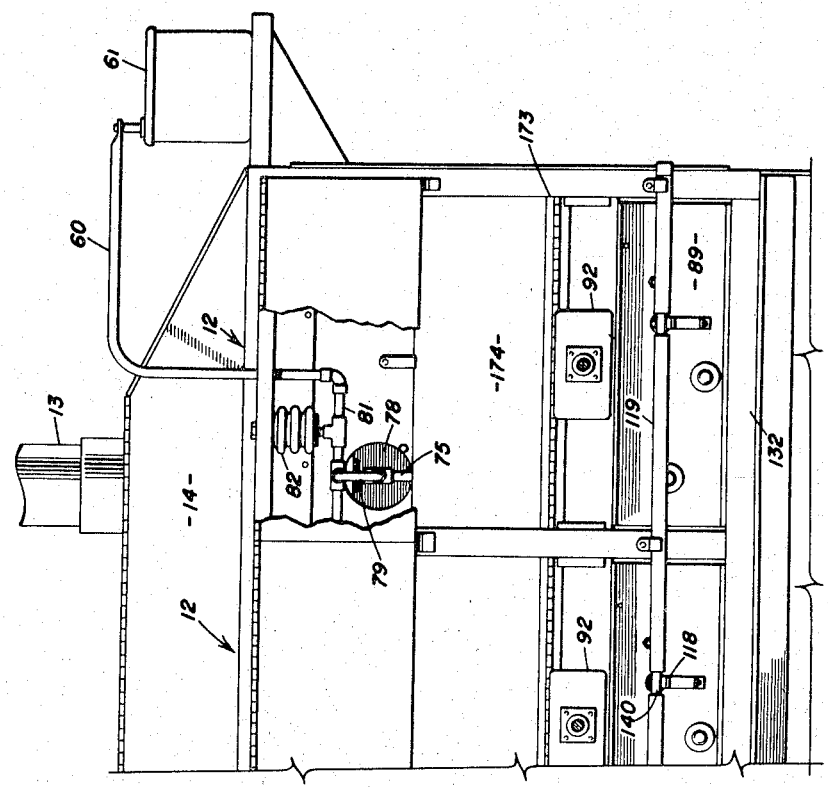
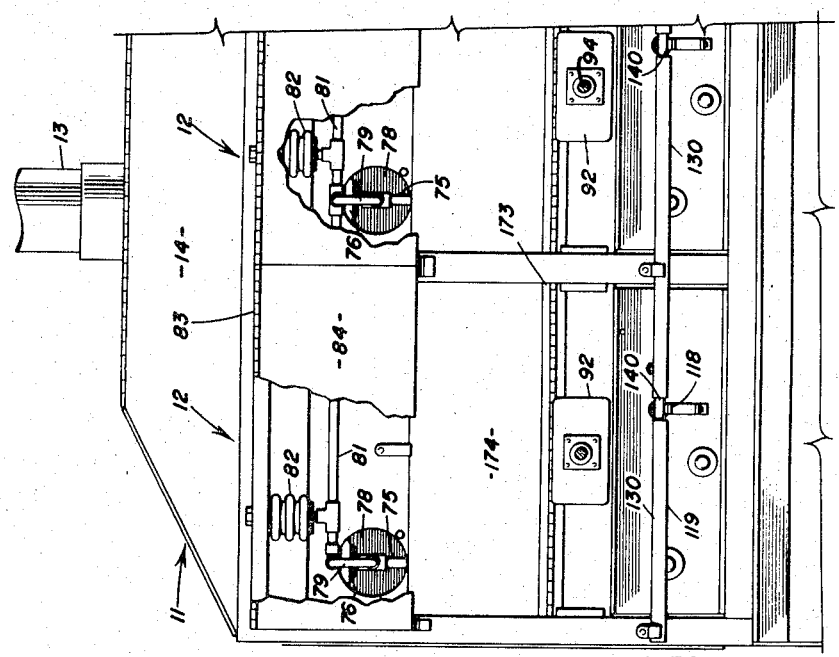
FIG. 6.
INVENTOR
JAMES HALL CARPENTER
ATTORNEYS

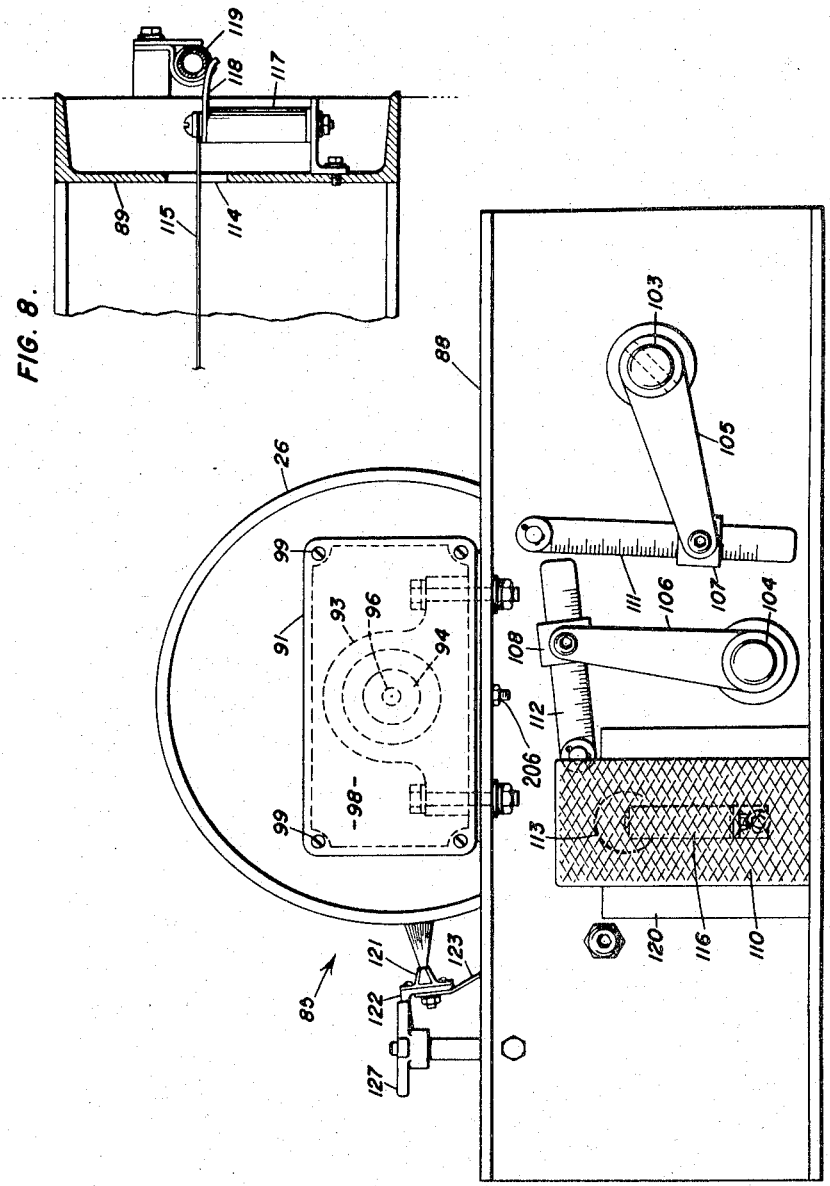

Feb. 27, 1968  J. H. CARPENTER  3,370,703
HIGH TENSION SEPARATOR
Original Filed Jan. 7, 1964  9 Sheets-Sheet 8
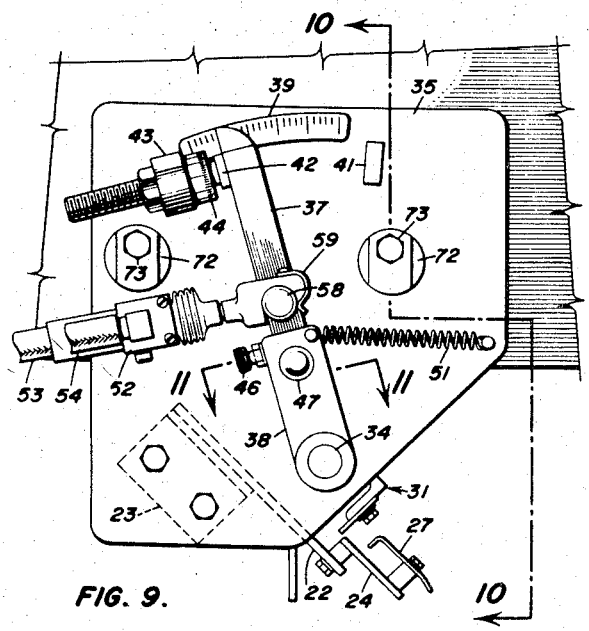
FIG. 9.
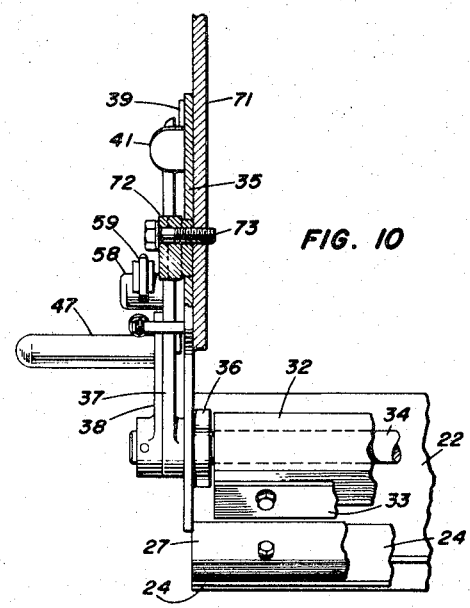
FIG. 10
FIG. 11.
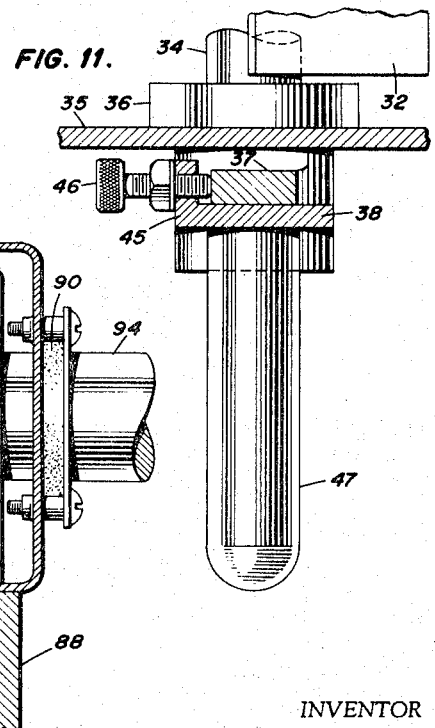
FIG. 12.
INVENTOR
JAMES HALL CARPENTER
BY
*Drona, Birch, Swindler & McKie*
ATTORNEYS Feb. 27, 1968  J. H. CARPENTER  3,370,703
HIGH TENSION SEPARATOR
Original Filed Jan. 7, 1964  9 Sheets-Sheet 9
FIG. 13
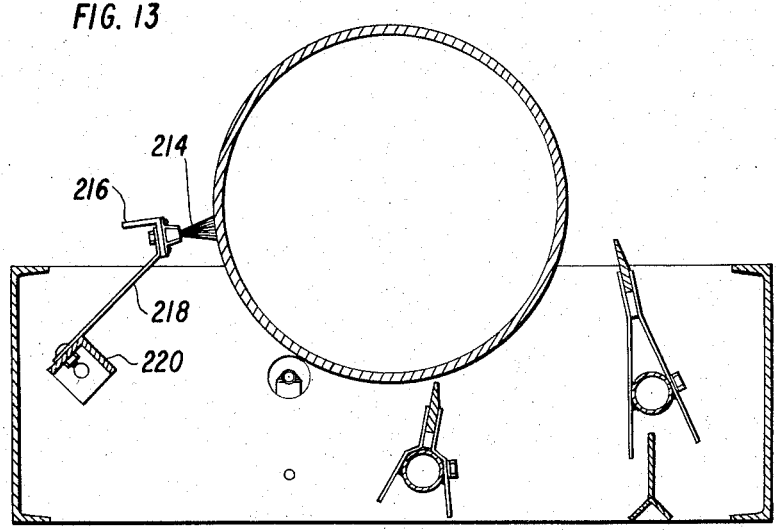
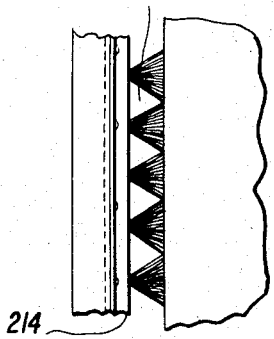
FIG. 14
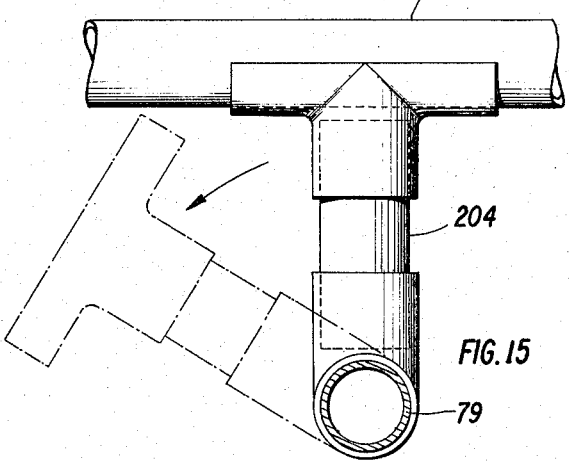
FIG. 15
FIG. 16
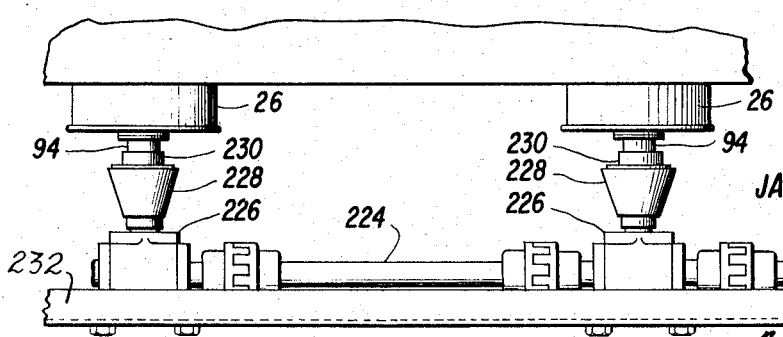
INVENTOR
JAMES HALL CARPENTER
BY Irons, Birch, Swindler & McKie
ATTORNEYS

United States Patent Office 3,370,703
Patented Feb. 27, 1968

3,370,703
HIGH TENSION SEPARATOR
James H. Carpenter, Jacksonville, Fla., assignor to Carpco Research & Engineering, Inc., Jacksonville, Fla., a corporation of Florida
Continuation of application Ser. No. 336,289, Jan. 7, 1964. This application Dec. 23, 1965, Ser. No. 517,885
19 Claims. (Cl. 209—127)

This is a continuation of my prior application entitled High Tension Separator, Ser. No. 336,289, filed Jan. 7, 1964, now abandoned, which in turn is a continuation-in-part of my still earlier application entitled High Tension Separator, Ser. No. 220,657, filed Aug. 31, 1962, now abandoned.

This invention relates to an improved construction for high tension separators.

Heretofore available high tension separators have been characterized by a variety of disadvantages. A serious problem which has confronted the art has been the delay and production loss occasioned by the extensive disassembly which has been necessary to accomplish repair or replacement of the rotor and its attendant components. Other disadvantages have included ineffective removal of pinned particles and dust from the rotor thereby causing excessive rotor wear; the building up of conductive particles on insulators, bearing members and the like; short bearing life due to lubricant breakdown resulting from the electrical grounding of the rotor through the bearing; excessive wear due to the abrasive action of the material to be separated; insufficient control of the rate of feed of material to be separated; and failure to stop the flow of such material to the rotor upon failure of the supply of electricity to the high voltage electrode.

To overcome the disadvantages of the prior art it is an object of the present invention to provide a high tension separator having a greatly improved construction.

Another object of the invention is to provide a high tension separator having an easily removable rotor assembly.

Other objects include the provision of a high tension separator wherein the rotor is grounded without passing current through the bearing, dust and pinned particles are effectively removed from the rotor surface, wear of the separator is minimized, the building up of conductive particles in the separator is reduced, the flow of material to be separated to the rotor is closely controlled and automatically shut off in response to failure of the supply of electricity to the high voltage electrode.

Broadly this invention is directed to improvements in a high tension separator comprising a housing, a grounded rotor mounted for rotation in said housing, means to deposit particles to be separated on the surface of said rotor, and a high voltage electrode mounted in said housing in cooperative relation with said rotor to cause separation of the particles on the rotor.

One aspect of this invention as disclosed in my application Ser. No. 220,657 is directed to a high tension separator comprising a housing having an opening in one side thereof; a rotor assembly including a supporting frame, a pair of spaced bearings connected to said frame, a grounded rotor mounted for rotation in said bearings, and electrically operated means to remove pinned particles from said rotor, said means being carried by said frame and including a first terminal; means mounted in said housing in cooperative relation with said supporting frame to movably support said rotor assembly, said rotor assembly being removable as an assembled unit from said housing through said opening; a second terminal mounted for connection to a source of electricity and having a releasable connection to said first terminal when said rotor assembly is in operative position in said housing; means to deposit particles to be separated on the surface of said rotor, and a high voltage electrode mounted in said housing in cooperative relation with said rotor to cause separation of the particles on the rotor. The present application is directed to various improvements in high tension separators generally as well as improvements in the high tension separator of my earlier applications.

The invention having been generally described a preferred specific embodiment will now be set forth in detail with reference to the accompanying drawings in which:

FIGURE 6 is a vertical section along the line 6—6 of FIGURE 5;

FIGURE 7 is a side elevation of the rotor assembly removed from the housing;

FIGURE 8 is a fragmentary vertical section showing the releasable electrical connection between the alternating current wiper and its source of supply;

FIGURE 9 is a detail of the actuating mechanism for the gate which controls the flow of material to be separated to the rotor;

FIGURE 10 is a vertical section taken along the line 10—10 of FIGURE 9;

FIGURE 11 is an auxiliary section taken along the line 11—11 of FIGURE 9;

FIGURE 12 is a detail partially in section of the arrangement for grounding the rotor;

FIGURE 13 is a vertical section of the rotor assembly showing a modification of the brush mounting means;

FIGURE 14 is a fragmentary top view of the brush of FIGURE 13;

FIGURE 15 is a fragmentary top plan view partially in section of a modification of the bus bar and conductor connection in closed position with the open position shown in phantom; and FIGURE 16 is a fragmentary top plan view of a modification of the driving means.

Figure 1:
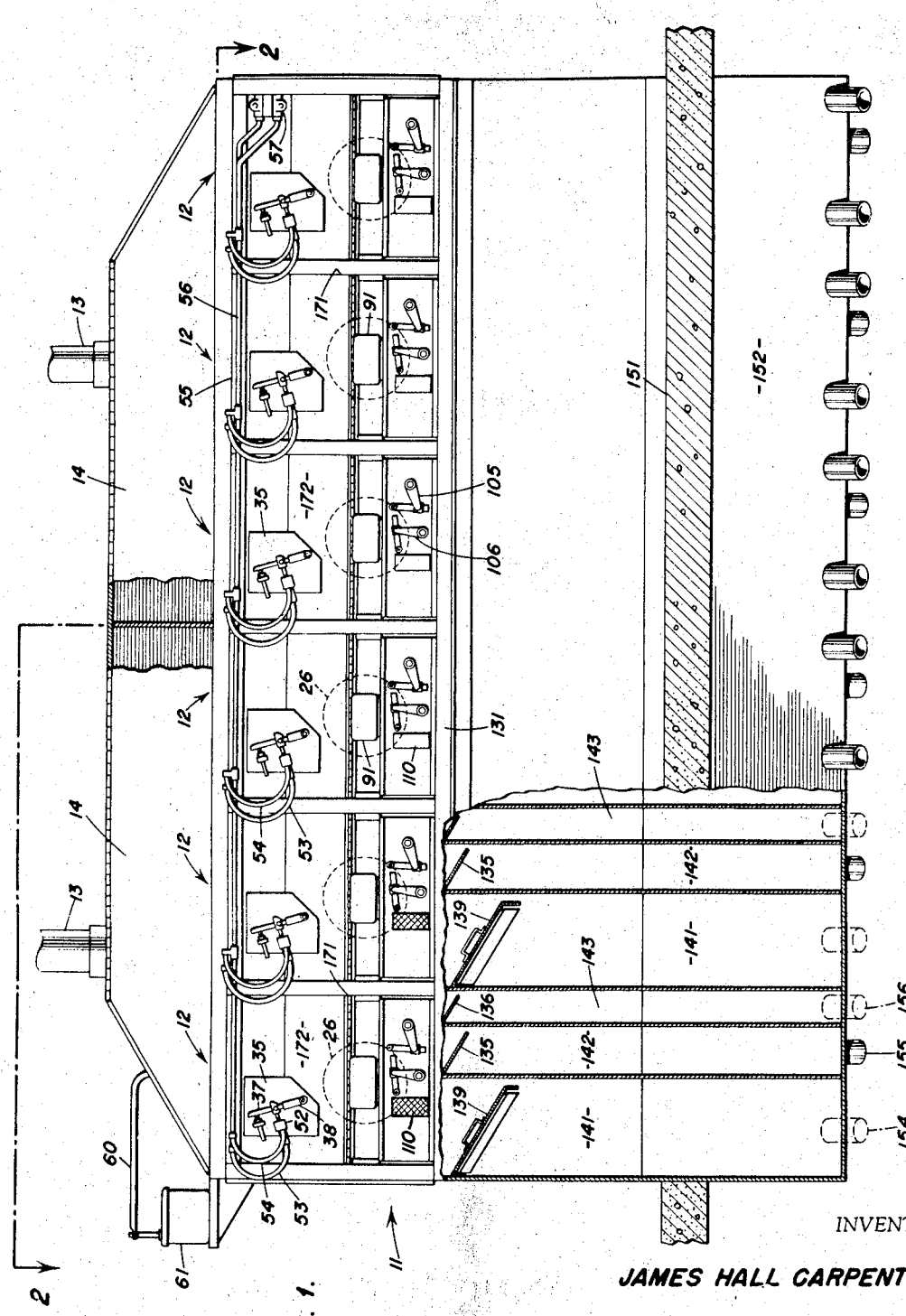
FIGURE 1 is a front elevation partially broken away of a high tension separator according to the invention.
Figure 2:
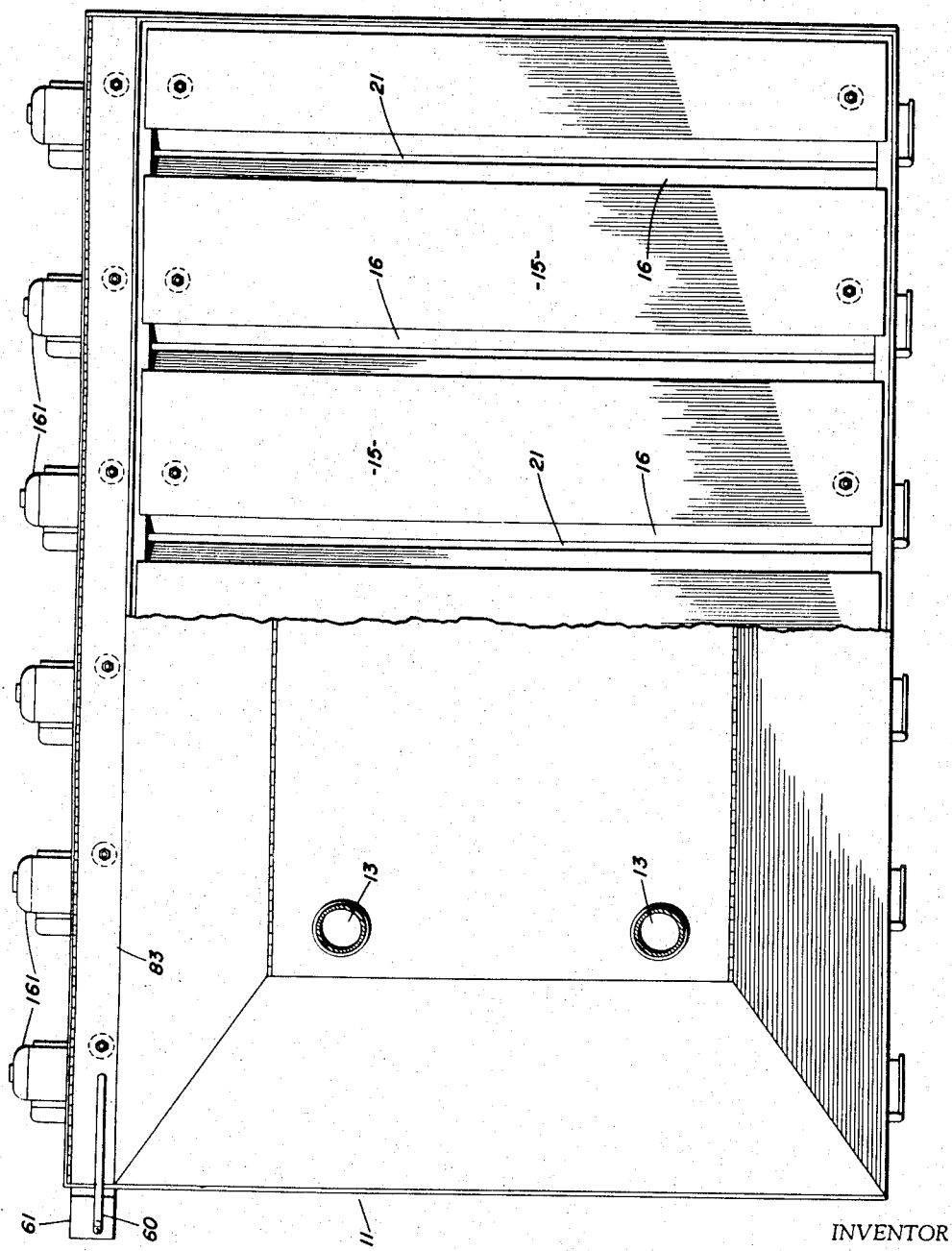
FIGURE 2 is a top plan view partially in section taken along the line 2—2 of FIGURE 1.

Illustrated in FIGURE 1 is a modular high tension separator which comprises a housing designated generally by the reference numeral 11. Situated within the housing is a plurality of individual high tension separator units 12. The units 12 are each enclosed in a separate compartment with a wall 10 situated between adjoining units to prevent substantial contamination of the atmosphere of each unit by that of the other units. The separating zone in each unit is totally enclosed. Desirably an exhaust fan is provided to maintain a slight negative pressure in each of the units and to air sweep the units to prevent build-up of dust on the components, particularly the electrical conductors.

The material to be separated, such as iron ore in particulate form, is fed through a plurality of inlet pipes 13 into a pair of compartments 14 in the upper portion of the housing which is also totally enclosed so as to require a minimum of effort by the exhaust fan to maintain the negative pressure. The compartments 14 are provided with a floor plate 15 (FIGURE 4) having an opening 16 in communication with each of the high tension separator units 12 which are identical. Thus, only one of the separator units 12 will be described in detail.

Each of the units 12 has a feed hopper 17 in communication with one of the openings 16 and is filled with the material to be separated through such opening. Desirably the compartments 14 are completely filled. Correspondingly the hoppers 17 are also filled. Each of the hoppers has inclined lower walls 18 and 19 which extend downwardly to define a narrow bottom outlet 21 through which the material is discharged. The angle of inclination may vary but 45° has been found satisfactory. Because the hopper is full, the movement of the material through the hopper consists of vertical flow in a relatively narrow path from the opening 16 to the discharge opening 21.

From the discharge outlet 21 the material is dropped onto an inclined feed plate 22 which is bolted or otherwise attached to a bracket 23 which in turn is securely fastened to a mounting plate 35. The material slides along the feed plate 22 and then over a raised extension plate or feed lip 24 which is connected to the lower end of the plate 22 and is held spaced thereabove by a continuous spacer 25. The material moves downwardly along the feed lip 24 and is deposited on a rotor 26. Attached to the feed lip 24 is a steel static shield 27 by means of a plurality of intermittent thin spacers 28 which allow the material to flow therebetween. Static shield 27 prevents charged particles from building up on feed plate 22 and feed lip 24 and also prevents bouncing of the particles as they leave the feed lip 24. The plates 22 and 24 are inclined from the horizontal at an angle which may be 45°. The flow of material along the plates 22 and 24 to the rotor is controlled by a feed gate 31 which includes an angle 32 to one leg of which is attached a valve plate 33 which may be moved into and out of the flowing material to control the rate of flow or stop it altogether. Preferably valve plate 33 is bolted to angle 32 and has oversized holes to permit adjustment to permit equal feed across the entire length of feed plate 22. The angle 32 is welded or otherwise fixed to a shaft 34 which is journalled between the pair of mounting plates 35 by means of bearings 36 and is mounted to feed plate 22 by means of bearings 202 which may protrude through slots 200 in angle 32. With angle 32 being mounted to the feed plate 22 as well as to the mounting plates 35, any sag in the feed plate 22 will bring a corresponding sag in the angle 32 and hence the desired spacing between the valve plate 33 and the feed plate 22 will be maintained. A blocking strip 208 is welded or otherwise fixed to bearings 36 and 202 to partially block the flow of material leaving hopper 17 and thus maintain a constant angle of repose of the material between the blocking strip 208 and feed plate 22.

Freely pivotable on the shaft 34 outside of the mounting plate 35 is a lever 37 (FIG. 9). Fixed to the extreme end of the shaft 34 outside of the lever 37 is a second lever 38. The outer end of the lever 37 cooperates with a scale 39 having suitable indicia to indicate the position of the feed gate. When the lever 37 is at the zero position it engages a stop 41. Movement of the lever 37 in the opposite direction is limited by an adjustable stop 42 which is threadably mounted in a standard 43. A micrometer 44 is provided to enable minute adjustment of the position of the adjustable stop 42, and hence the minute adjustment of the feed. The micrometer 44 also allows a given rate of feed to be reproduced after the desired setting has once been found.

Movement of the lever 37 is transmitted first to the lever 38 and then to the shaft 34. The lever 38 has a flange 45 which extends across the edge of lever 37 and threadably receives a set screw 46, the inner end of which engages the edge of the lever 37. The lever 38 is biased in a direction to close the feed gate by a tension spring 51 which is connected between the upper end of the lever 38 and the mounting plate 35. Movement of the lever 38 by the spring 51 is transmitted to the lever 37 by the set screw 46. The lever 37 is moved in the opposite direction against the force of the spring 51 by a pneumatic cylinder 52 to which air lines 53 and 54 are connected to operate the cylinder. The cylinder 52 is connected to a protrusion 58 on the lever 37 by means of a spring clip 59.

When the cylinder 52 is actuated, the lever 37 is moved against the adjustable stop 42 to open the feed gate to the degree determined by the position of the stop 42. When the cylinder 52 is deactivated the lever 37 is pulled against the fixed stop 41 by the spring 51 to close the feed gate. When the feed gate is again opened by actuation of the air cylinder it is automatically returned to the proper setting by engagement of the lever 37 with the preset stop 42. The lever 38 may be employed independently of the lever 37 to open the feed gate 31 by means of the manually operated handle 47 to permit the dumping of foreign particles trapped in hopper 17.

The combination of the levers 37 and 38 permits zero adjustment of the feed gate 31. When the lever 37 is against the stop 41 and indicates zero on the scale 39, the set screw 46 may be adjusted to move the lever 38 with respect to the lever 37 until the feed gate 31 is inserted into the stream of material to be separated to the precise degree that flow is completely shut off.

The mounting plate 35 is adjustably connected to the vertical wall 71 of the housing 11 by means of a pair of eccentric bushings 72. The bushings 72 are bolted to the wall 71 by bolts 73. When the bolts are loosened, the bushings may be rotated to adjust the position of the mounting plate 35 with respect to the wall 71. This adjustment enables the feed lip 24 to be precisely positioned with respect to the rotor 26.

As shown in FIGURE 1 the air lines 53 and 54 are connected by conduits 55 and 56 to a solenoid operated valve 57. The solenoid which controls the operation of the valve 57 is electrically connected to the low voltage side of the transformer which supplies the high voltage DC electrode 62. Thus, when the supply of electricity to the high voltage electrode 62 is interrupted, the solenoid is energized to operate the valve 57 to close the feed gate 31.

Figure 4:
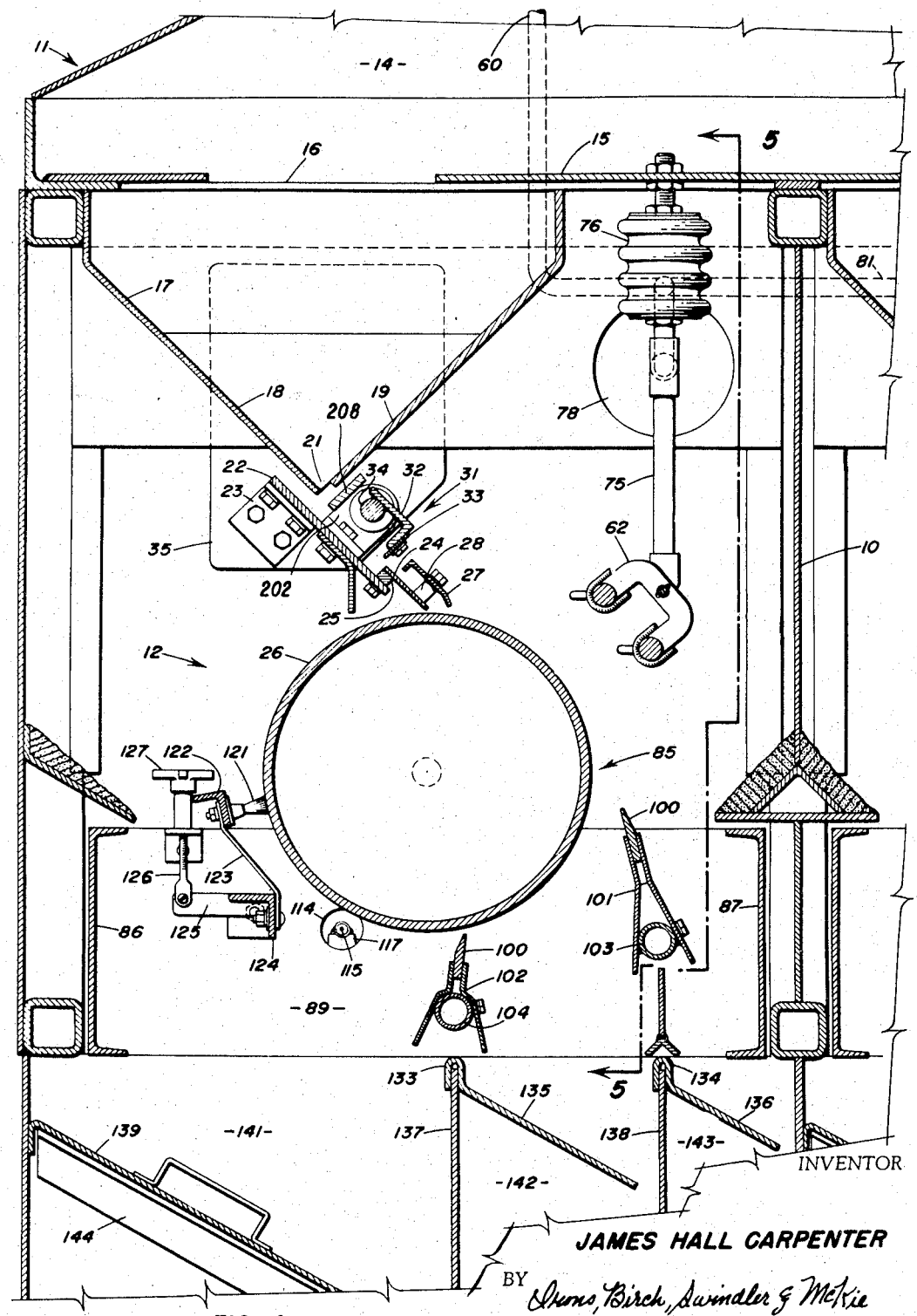
FIGURE 4 is a fragmentary vertical section to an enlarged scale taken through one of the separator units.
Figure 5:
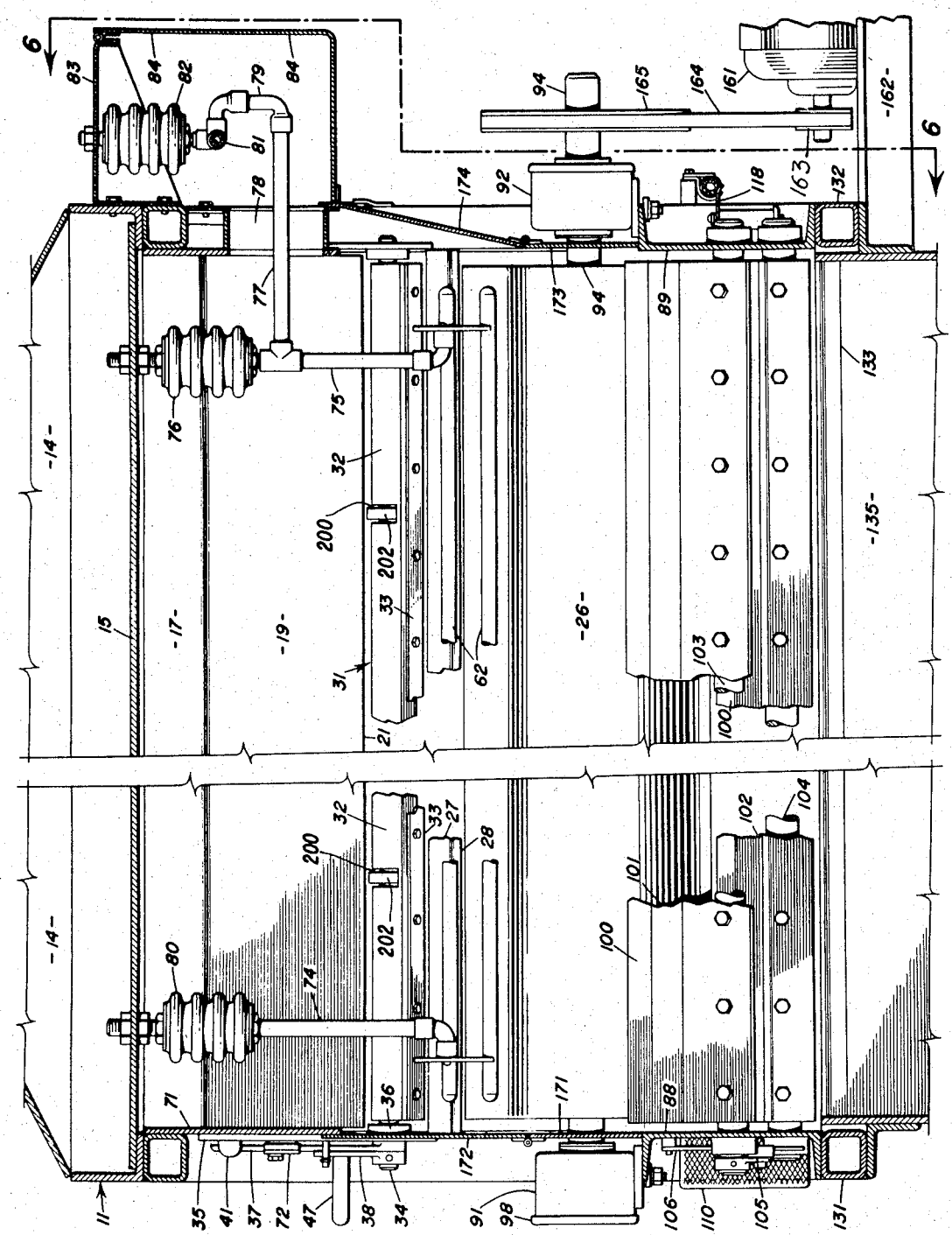
FIGURE 5 is a vertical section taken along the line 5—5 of FIGURE 4.

The high voltage electrode 62 cooperates with the rotor 26 in the conventional manner to cause separation of particles on the rotor. Such electrode preferably is of the dual beam type with a tungsten wire emitter. The details of the separation and the techniques by which it is accomplished are well known to the art and will not be discussed here. It suffices to state that cooperation of the electrode 62 and the grounded rotor 26 results in separation of the particles in accordance with their electrical characteristics. Specifically, the first group of particles will be thrown or repelled from the rotor. A second group of particles, or middlings, will be unaffected and simply will fall free by gravity from the rotor. A third group of particles will be pinned to the rotor and carried around with it until they are removed as described hereinafter. The electrode 62 is charged with a high voltage direct current through a hollow conductor 75 which is connected to the housing by an insulator 76 as shown in FIGURE 4. The opposite end of the electrode 62 is hung by a tube 74 and insulator 80. The magnitude of the DC voltage may vary but 40,000 volts or even more might be employed. The DC voltage is applied to the conductor 75 by a horizontal conductor 77 which extends laterally through a horizontal opening 78 in the rear wall of the housing as best shown in FIGURE 5. Thus, an insulating air gap is left between the conductor 75 and the wall of the opening 78. This gap prevents material build-up which could cause a power failure.

A removable generally U-shaped conductor section 79 connects the outer end of the horizontal conductor 77 with an elongated bus bar 81. The bus bar 81 may be selectively connected or disconnected with any of the high voltage electrodes in the various separator units by removal, as by a fuze puller, or by replacement of the U-shaped section 79, or, as is shown in FIG. 15, the U-shaped section 79 may be provided with a pivotable arm 204 whereby arm 204 may be swung away from the bus bar thus disconnecting the individual unit without shutting off power to the other units. Accordingly, any of the separator units may be shut down for repair or replacement of parts and the remaining units may continue in operation.

The bus bar 81 is hung from the housing by a plurality of insulators 82. The insulators 76, 80 and 82 preferably are formed of ceramic material. The bus bar 81 is connected by a conductor 60 to an industrial rectifier 61 which in turn is connected to an appropriate source of electricity. Preferably the bus bar 81 and the conductors leading to the rectifier 61 and the electrode 62 are formed of copper or other highly conductive tubing free of any surrounding insulating material. The bus bar system is mounted outside of the dusty atmosphere of the separating zone and is enclosed within a compartment 83 having a hinged inspection door 84.

As shown in FIGURE 4, there is situated within each of the separator units 12 a removable rotor assembly 85. Such assembly includes a supporting frame which may comprise a rectangular box, two opposing walls which are formed by channels 86 and 87 having inturned flanges. The other two walls of the supporting frame box are formed by a pair of channels 88 and 89 having outturned flanges. Bolted or otherwise connected to the upper flanges of the channels 88 and 89 are a pair of bearing housings 91 and 92 as shown in FIGURE 5. As shown in FIGURE 12, the bearing housing 91 contaings a bearing 93 in which one end of the rotor shaft 94 is journalled. The other end of the rotor shaft is journalled in a similar bearing in the housing 92. Each of these bearings is provided with registered pins 206 (FIGURE 7) for positive location of the bearing on the channels 88 and 89. A dogpoint set screw in each bearing fits into an annular slot in the ends of the shaft 94. The bearings are preferably located completely outside of the housing 11 and the bearing housings 91 and 92 are preferably sealed to render them dustproof. A dry felt seal 90 is situated around the shaft 94 and held in position by a bolted connection. A gasket 100a is situated between the main portion of the housing 91 and its end cover plate 98. Housing 92 is similarly sealed.

The rotor shaft 94 is provided with means to ground it to the channel 88 through a path passing outside of the bearing 93. Where grounding is effected through the bearing there is a tendency to break down the lubricant and cause excessive bearing wear. Specifically the outer end of the shaft 94 which extends through the bearing 93 is provided with an axial cylindrical bore 95. Slidably received in the bore 95 is a cylindrical carbon brush 96 which is biased outwardly by a compression spring 97 situated interiorly of the brush 96 in the bore 95. Thus, the brush 96 is resiliently urged into firm contact with the end plate 98 of the bearing housing 91. The end plate is connected to the housing 91 by a plurality of screws 99 which as shown in FIGURE 7 extend into corner bosses of the bearing housing. Thus, the cover plate 98 is grounded to the housing 91 which in turn is grounded to the channel 88. The channel 88 rests on cross members of the main framework of the housing 11, thus completing the grounding of the rotor.

As shown in FIGURE 4, the rotor assembly 85 also includes a pair of splitter plates 101 and 102 which preferably comprise removable blades 100 of hardened steel. The splitter plates are fixed to shafts 103 and 104 respectively. These shafts in turn are journalled between the channels 88 and 89 in suitable bearings. Attached to the ends of the shafts 103 and 104 outside of the channel 88 are one end of levers 105 and 106 respectively (FIGURE 7). The opposite ends of each of the levers 105 and 106 are connected to slides 107 and 108 which in turn are slidable along indicators 111 and 112 respectively and which contain scales to permit minute adjustment of the splitter plates 101 and 102.

Also extending between the channels 88 and 89 and through openings 113 and 114 therein is a fine wire electrical conductor 115 (FIGURES 4 and 8) which conductor functions as a high voltage, high frequency alternating current wiper for the rotor. The air in the openings 113 and 114 acts as an insulator, thus eliminating any need for insulating material upon which particles could build up. As is true with all the openings in the separator the negative pressure causes air to move in through openings 113 and 114, thus preventing dust from coming out therethrough. The outer ends of the conductor 115 are connected to insulators 116 (FIGURE 7) and 117 (FIGURE 8) which are mounted on the outside of channels 88 and 89 respectively to prevent buildup of conductive particles. The insulator 116 and its connection to the wire 115 are surrounded by an expanded metal cage 110 connected to the channel 88 by clips 120. The insulator 117 carries a conductive spring metal terminal 118 which is electrically connected to the conductor 115. The terminal 118 slidably engages a bus bar 119 which as shown in FIGURE 6 extends longitudinally along the housing. The bus bar 119 preferably is composed of copper tubing with spaced insulating sleeves 130 leaving therebetween fixed terminals 140 for contact with the movable terminals 118. The bus bar 119 is connected to a suitable source of high frequency, high voltage, alternating current. The alternating current has a frequency preferably in the range from about 300 to about 500 cycles per second. The voltage may vary but excellent results have been achieved using 29,000 volts. This high frequency alternating current voltage is imposed upon the fine wire conductor 115 which is spaced a short distance away from the rotor 26 and extends longitudinally of such rotor. The high frequency alternating current crosses the gap to the rotor and neutralizes the charge of pinned particles and dust on the surface of the rotor as they are moved past the wire 115. In the past, low frequency alternating current wipers, such as conventional 60 cycle AC, have been employed to neutralize such particles. While such can be used, it has been found that the high frequency in the range from 300 to 500 cycles constitutes a marked improvement over the use of a low frequency alternating current. Between 90% and 100% of the particles and dust clinging to the rotor are removed by the present device.

As shown in FIGURE 4, any few particles which are not removed by the alternating current wiper are removed by a brush 121 which may have fiber bristles which are held in firm contact with the surface of the rotor. The brush 121, which is removable for easy maintenance, is connected by means of bolts or the like to an angle 122 which in turn is connected to a continuous metallic spring arm 123. The other end of the arm 123 is connected to an angle 124 which is pivoted between the channels 88 and 89. Pivotal movement of the angle 124 is effected by a lever arm 125 which is actuated by a threaded link 126 which may be moved vertically by a handle 127. Accordingly, the pressure which is applied to the brush 121 by the spring arm 123 is controlled by adjustment of the handle 127. A modification of the brush is shown in FIGURE 13. The brush 214 is connected to an angle 216 which acts as a weight to urge the brush in firm contact with the surface of the rotor. Angle 216 is mounted on one end of an arm 218. The other end of arm 218 is connected to an angle 220 which is pivoted between the channels 88 and 89. The arm 218 is of such a length that when the bristles of the brush wear out the remainder of the brush assembly will fall past the rotor surface without coming into contact therewith. This prevents the brush assembly from scoring the surface of the rotor. As may be seen in FIGURE 14, the bristles of the brush 214 may be mounted in clusters spaced so as to provide a series of openings 222 between the bristles to allow drainage of particles of the material being processed and prevent the abrading of the rotor surface by the building up of these particles.

As shown in FIGURE 5, the rotor 26 is rotated by a motor 161 which may be electric and is mounted on a supporting table 162 attached to the outside of the housing 11. The motor has a pulley 163 which is connected by a belt 164 to a pulley 165 which is fixed to the outer end of the rotor shaft 94. All of the motors 161 are mounted entirely outside of the housing 12 thus leaving them free of the atmosphere within the separating units.

FIGURE 16 illustrates a modification of the driving means. A main drive shaft 224 driven by a motor (not shown) is mounted by a plurality of right angle gear members 226 on bracket 232 which in turn is mounted on housing 11 at one end of the rotors 26. A driving member 228 of a cone-type clutch is mounted on the end of each gear 226 and the driven member 230 of the cone-type clutch is mounted on the end of shaft 94 of each rotor 26. The individual rotors may be connected to or disconnected from the main drive shaft while the drive shaft is turning by merely urging the driving and driven members of the cone-type clutch into engagement or out of engagement.

Figure 3:
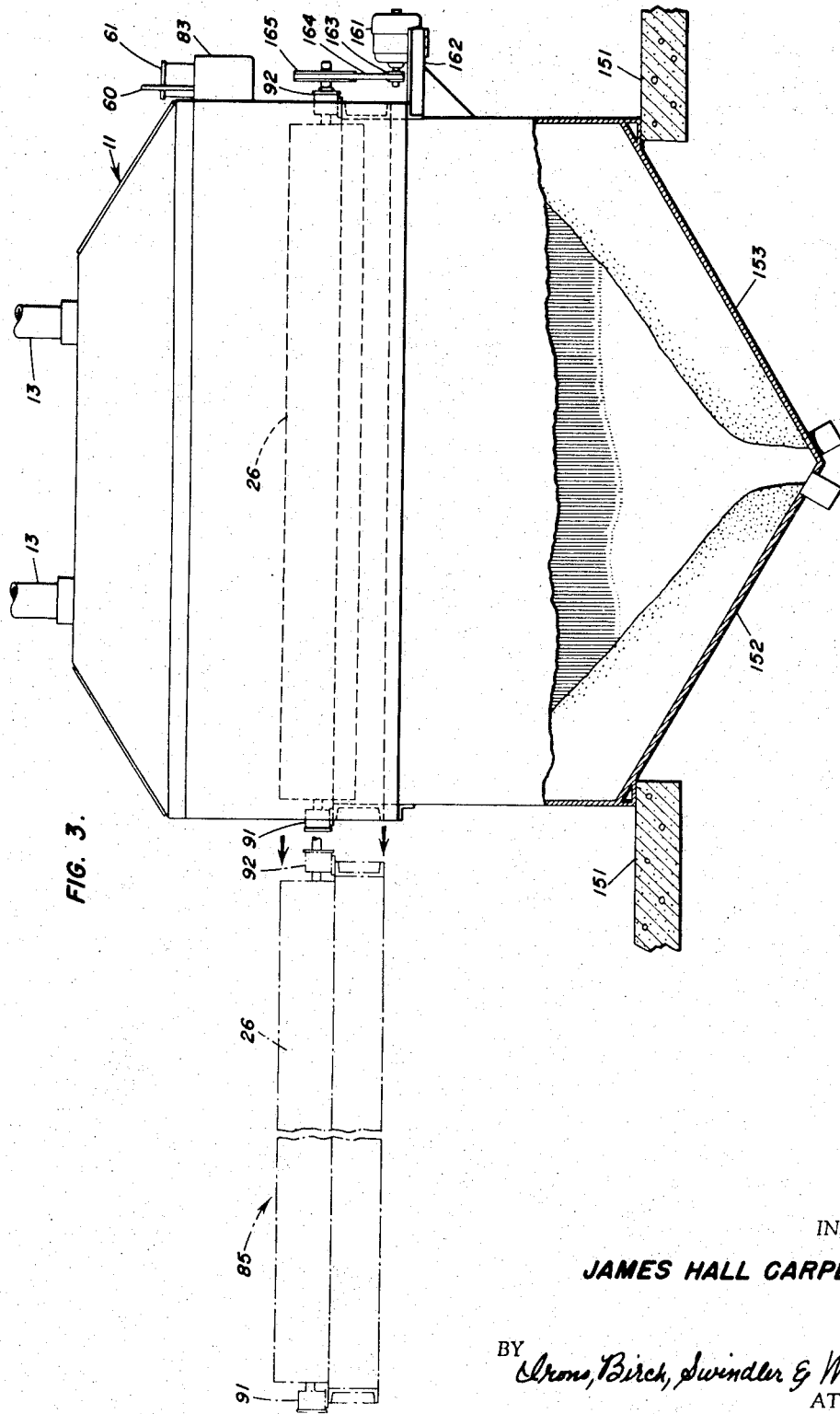
FIGURE 3 is a side elevation partially broken away of the apparatus of FIGURE 1.

As illustrated in FIGURE 3, the rotor assembly 85 may be removed as an assembled unit from the housing. When the rotor assembly is in its operative position within the housing the channels 88 and 89 are supported by horizontal members 131 and 132 (FIGURE 5). The rotor assembly slides outwardly along the member 131 which is engaged by the lower flanges of the channels 86 and 87. During the passage outwardly of the rotor assembly the bottom of the channel 89 is supported by noses 133 and 134 formed by the tops of inclined dust baffles 135 and 136 which in turn are supported by vertical walls 137 and 138. The walls 137 and 138 divide the lower part of the housing into a series of three vertical channels 141, 142 and 143 into which channels the three groups of separated particles are directed as they pass the splitter plates in the usual manner. A third inclined dust baffle 139 is removably mounted in the channel 141 to permit inspection of the material in the lower portion of such channel. Specifically, the dust baffle 139 is supported at its ends by a pair of angles 144 which are connected to the housing. The dust baffles 135, 136 and 139 effectively prevent dust from being blown back from the channels 141, 142 and 143 by eddy currents or the like.

The lower portion of the housing is supported as shown in FIGURE 3 in an opening in the floor 151 which acts as a support for the entire separator. The inclined lower walls 152 and 153 of the housing protrude through such opening to permit the separated material to be deposited from each of the channels 141, 142 and 143 through outlets 154, 155 and 156 respectively. Preferably the inclined walls 152 and 153 and the dust baffles 135, 136 and 139 as well as all other transverse surfaces in the separator unit on which the material being separated may collect comprise dead beds. Such surfaces are inclined from the horizontal at an angle less than the angle of repose of the material. Thus wear of such surfaces is materially diminished. It has been found that an inclination of 37° from the horizontal is satisfactory for the dead bed surfaces.

The front wall of each of the separator units 12 is closed by a slip-in closure panel 171 which fits between the bearing housing 91 and the end oft he rotor. The panel 171 may be slotted to receive the rotor shaft 94. If desired, releasable clips or the like may be employed to attach the panel 171 in position. A hinged inspection door 172 is provided in the closure panel 171 to permit visual observance of each of the separator units. A similar slip-in closure panel 173 is provided to close the opening in the rear wall of the housing 11. The panel 173 is also provided with a hinged inspection door 174. The panel 173 fits between the bearing housing 92 and the rotor and is slotted to receive the shaft 94. Such panel may be attached by suitable releasable clips or the like as required.

In operation, material such as iron ore to be separated is moved through the conduits 13 into the compartment 14 in the upper part of the housing 11. The material is then passed through openings 16 into the hoppers 17 of each of the separator units. The material then passes through the outlet 21 onto the feed plate 22 where it travels downwardly over the feed lip 24. The flow of material across the lip 24 is controlled by the feed gate 31. The particles descend from the lip 24 onto the rotor 26 which is rotated by the motor 161 (or by the drive shaft 224). As the particles move past the electrode 62 they are separated according to their characteristics in the conventional manner. The first group of particles is thrown from the rotor 26 past the splitter plate 101 and descends into the channel 143. A second group of middling particles falls by gravity between the splitter plates 101 and 102 into the channel 142. A third group of particles is pinned to the rotor and is carried on the rotor surface past the splitter plate 102. The pinned particles are subjected to the action of the high frequency alternating current wiper 115 which neutralizes the particles and causes them to drop by gravity into the channel 141. If any particles or dust remain on the rotor after treatment by the high frequency AC wiper they are removed by the brush 121 (or 214).

The main housing 11 is so constructed that if any component of the rotor assembly is damaged the entire rotor assembly may be easily removed as an assembled unit and quickly replaced by a duplicate assembly. Thus, the apparatus remains in operation during repair of replacement of the defective component or components of the rotor assembly. Removal of the rotor assembly is accomplished by sliding out the slip-in closure panels 171 and 173 and removing the belt 164 (if the cone clutch is not used). Then the rotor assembly may be slid as a unit out of the opening in the housing left by the removed closure panel 171. Such movement of the rotor disconnects the spring metal terminal 118 from its corresponding fixed terminal on the bus bar 119 while leaving the wipers of the remaining units operable. The replacement rotor assembly is then slid into the housing until the spring terminal 118 makes sliding contact with its corresponding terminal on the bus bar 119. The closures 171 and 173 are then replaced and the belt 164 is attached. The apparatus is then ready for operation with the replaced rotor in use. If the cone-type clutch is used as the drive means the belt 164 is elimated and the movement of the rotor out of and into the housing disconnects and connects the clutch automatically while leaving the remaining ends operable. It has been found that removal and replacement of the rotor assembly can be accomplished in less than ten minutes.

There has been illustrated and described what is considered a preferred specific embodiment of the invention. It will be understood however that many modifications may be made by persons skilled in the art without departing from the scope of the invention which is determined solely by the appended claims.

I claim:

1. A high tension separator comprising a housing enclosing a plurality of separator units and having an opening in one side of said housing for each of said units; a rotor assembly mounted in each of said separator units; each of said rotor assemblies including a supporting frame, a pair of spaced bearings connected to said frame, a rotor mounted for rotation in said bearings, and electrically operated means to remove pinned particles from said rotor, said means being carried by said frame and including a first terminal; a trackway mounted in said housing in cooperative relation with said supporting frame to guide and movably support said rotor assembly to permit said rotor assembly to be removable as an assembled unit from said housing through the associated opening; said trackway acting to support and guide said assembly during removal; a plurality of second terminals mounted for connection to a source of electricity and having respective releasable connections to said first terminals when said rotor assembly is in operative position in said housing; means in each of said units to deposit particles to be separated on the surface of each of said rotors; a high voltage electrode mounted in said housing in each of said units in cooperative relation with a respective one of said rotors to cause separation of the particles on the rotor; a bus bar mounted for connection to a source of high voltage electricity; and a plurality of electrical conductors connecting said bus bar with respective ones of said high voltage electrodes, each of said conductors including a generally U-shaped removable section to permit selective disconnection of each of said high voltage electrodes from said source of high voltage electricity.

2. A high tension separator according to claim 1 wherein a second bus bar defines each of said second terminals, and each of said first terminals comprises a conductive spring blade slidably contacting said second bus bar at one of said second terminals when one said rotor assembly is in operative position in said housing.

3. In a high tension separator of the type having a housing, a rotor mounted inside the housing and adapted to be rotated about a horizontal axis, means above the rotor to deposit particles to be separated on the surface of the rotor, an electrode mounted in the housing in cooperative relation with the rotor to cause separation of the particles on the rotor, a brush mounted adjacent to the rotor with its bristles in contact with the surface of the rotor for wiping patricles therefrom, and means beneath the rotor for separately collecting the separated particles, the improvement comprising: a weight connected to the brush for urging the brush toward the rotor surface with a constant force; and an arm, one end of which is connected to the brush and the other end of which is pivotally connected to a support, said arm being supported solely by the brush and the pivotal connection thereof to the support and being of such a length that when the bristles of the brush wear out, said arm, said weight and the remainder of the brush will fall past the surface of the rotor without coming into contact therewith.

4. In a high tension separator of the type having a housing, a rotor mounted inside the housing and adapted to be rotated about a horizontal axis, means above the rotor to deposit particles to be separated on the surface of the rotor, an electrode mounted in the housing in cooperative relation with said rotor to cause separation of the particles on the rotor, a brush mounted adjacent to the rotor with its bristles in contact with the surface of the rotor for wiping particles therefrom, and means beneath said rotor for separately collecting the separated particles, the improvement comprising: a brush mounting means including a spring arm one end of which is connected to the brush; a support means connected to the other end of said arm and pivotally mounted in the housing; a lever, one end of which is connected to said support means; and a threaded link connected to the other end of said lever and threaded in a support mounted in said housing, whereby the turning of said support will pivot said pivotable support means and adjust the force with which said spring arm urges said brush against the surface of the rotor.

5. In a high tension separator comprising; a housing; a rotor mounted in said housing and adapted to be rotated about a horizontal axis; particles depositing means positioned above said rotor to deposit particles to be separated on the surface of said rotor; a high voltage electrode mounted in said housing in cooperative relation with said rotor to cause separation of the particles on said rotor; and means beneath said rotor for separately collecting the separated particles; the improvement wherein said particle depositing means includes a support, an adjustable feed plate mounted on said support, an adjustable gate mounted on said support and adapted to cooperate with said feed plate to control the flow of the particles, a shaft connected to said gate, bearing means independent of said support journalling said shaft and connected to said plate for ensuring that the special relationship between said gate and said plate will remain constant for each adjusted position of said gate, and gate activating means connected to said gate and being responsive to the interruption of flow of electricity to said high voltage electrode to close said gate.

6. The high tension separator of claim 5 wherein the gate activating means comprises: an integral extension of said shaft extending from said feed gate; a first lever connected to the end of said shaft extension; a second lever journalled on said shaft extension and being movable between a fixed stop and an adjustable stop; a scale mounted between the fixed stop and the adjustable stop and adapted to cooperate with the second lever to indicate the position of the feed gate; means yieldably urging said first lever into a position which closes said feed gate; means connected to said second lever to automatically pull said second lever into contact with said adjustable stop; and engaging means connected to said first lever for engaging said second lever.

7. The high tension separator of claim 6 wherein a handle is connected to said first lever for manually opening said gate; and said engaging means contacts only one side of said second lever whereby the gate may be opened fully by said handle without moving said second lever.

8. The high tension separator of claim 6 wherein said engaging means is adjustable whereby the relationship between the amount of opening of said gate and the position of said second lever on said scale may be adjusted.

9. The high tension separator of claim 5 wherein a feed lip is mounted on one end of said feed plate for directing the particles onto the rotor whereby the adjustment of said feed plate will adjust the spatial relation between said feed lip and said rotor.

10. The high tension separator of claim 9 wherein a static shield is mounted above said feed lip and extends parallel thereto whereby particles on the feed plate are prevented from becoming charged and the bouncing of the particles leaving the feed lip is reduced.

11. The high tension separator of claim 5 wherein a blocking means is mounted on said bearing means and extends perpendicular to said feed plate to partially block the particles as the pass over said feed plate whereby a constant angle of repose of the particles is maintained on said feed plate between said blocking means and said feed plate.

12. A high tension separator comprising: a housing having an opening in one side thereof; a rotor assembly including a supporting frame, a pair of spaced bearings connected to said frame, a rotor mounted on a shaft journalled for rotation in said bearings, means to electrically ground said shaft to said supporting frame through a conductive path passing outside of said bearings, splitter plate means to divide separated groups of particles leaving said rotor, means to adjust said splitter plate means, and electrically operated means to remove pinned particles from said rotor, said electrically operated means being carried by said frame and including a first terminal; a trackway mounted in said housing in cooperative relation with said supporting frame to guide and movably support said rotor assembly to permit said rotor assembly to be removed as an assembled unit from said housing through said opening, said trackway acting to support and guide said assembly during removal; a second terminal mounted for connection to a source of electricity and having a releasable connection to said first terminal when said rotor assembly is in operative position in said housing; a high voltage electrode mounted in said housing in cooperative relation with said rotor to cause the separation of particles deposited on the rotor; a bus bar mounted for connection to a source of high voltage electricity; an electrical conductor connecting said bus bar with said high voltage electrode, said conductor including a removable section to permit selective disconnection of said high voltage electrode from said source of high voltage electricity; and means to deposit particles to be separated on the surface of said rotor including an adjustable gate to control the flow of particles and means to actuate said gate, said gate actuating means being responsive to the interruption of flow of electricity to said high voltage electrode to close said gate.

13. A high tension separator according to claim 12 wherein said gate is pivotable and said gate actuating means comprises lever means for pivoting said gate, a fluid operated cylinder to move said lever means, and solenoid means to cause said fluid operated cylinder to close said gate in response to said interruption of flow.

14. A high tension separator according to claim 13 wherein adjustable means are provided to preset the degree of opening of said gate by said gate actuating means.

15. A high tension separator as recited in claim 12 wherein said supporting frame comprises a pair of spaced parallel upright beams having upper flanges carrying said bearings, and said rotor extends transversely between said beams.

16. A high tension separator according to claim 12 wherein said grounding means comprises an electrically conductive brush mounted in an axial opening in one end of said shaft, resilient means biasing said brush outwardly, and a conductive housing connected to said supporting frame and surrounding the bearing at said one end of said shaft, and bearing housing having an end plate engaging said brush.

17. A high tension separator according to claim 12 wherein said means to remove pinned particles from said rotor comprises a wire extending longitudinally of said rotor and spaced from the surface thereof, said wire being charged with alternating current at a frequency in the range of from about 300 to 500 cycles per second.

18. A high tension separator according to claim 12 wherein said splitter plate adjusting means comprises a shaft connected to and extending from said splitter plate means, a lever connected at one end thereof to said shaft, a slide connected to the other end of said lever, and a fixed calibrated indicator having said slide moveably connected thereto whereby the position of the slide on the indicator shows the position of the splitter plate means.

19. A high tension separator comprising a housing enclosing a plurality of separator units; a rotor assembly mounted in each of said separator units, each of said rotor assemblies including a supporting frame, a pair of spaced bearings connected to said supporting frame, a rotor mounted on a shaft journalled for rotation in said bearings, means to electrically ground said shaft to said supporting frame through a conductive path passing outside of said bearings, splitter plate means to divide separated groups of particles leaving said rotor, and means to adjust said splitter plate means; means mounted in said housing in cooperative relation with each said supporting frame to movably support each said rotor assembly, each said assembly being removable as an assembled unit from said housing through an associated opening therein; a high voltage electrode mounted in said housing in each of said separator units in cooperative relation with a respective one of said rotors to cause the separation of particles deposited on the rotor; a bus bar mounted for connection to a source of high voltage electricity; a plurality of electrical conductors connecting said bus bar with respective ones of said high voltage electrodes, each of said conductors including a removable section to permit selective disconnection of each of said high voltage electrodes from said source of high voltage electricity; means in each of said separator units to deposit particles to be separated on the surface of each of said rotors including an adjustable gate to control the flow of particles and means to actuate said gate, said gate actuating means being responsive to the interruption of flow of electricity to said high voltage electrode to close said gate; a main drive shaft mounted at one end of said rotors on said housing; a plurality of right angle gears mounted on said main drive shaft with one gear adjacent to a respective one of said rotors; a driving member of a cone clutch mounted on each of said right angle gears; and a driven member of a cone clutch mounted on each of said shafts mounting a rotor whereby an individual rotor assembly may be removed from said separator and will automatically disengage itself from said main drive shaft without disturbing the operation of the remaining rotors.

References Cited

UNITED STATES PATENTS

| | | | |
|---|---|---|---|
| 2,224,719 | 2/1880 | Osborne | 209—129 |
| 624,965 | 5/1899 | Oester | 209—386 |
| 735,713 | 8/1903 | Crofoot | 209—386 |
| 1,116,951 | 11/1914 | Sutton | 209—128 X |
| 1,192,982 | 8/1916 | Bristol | 339—22 X |
| 1,415,859 | 5/1922 | Bates | 210—396 X |
| 1,438,860 | 12/1922 | Rout | 210—396 X |
| 1,471,559 | 10/1923 | Knauf | 103—111 |
| 2,213,510 | 9/1940 | Wiegand | 209—127 |
| 2,256,118 | 9/1941 | Kyropoulos | 317—2 X |
| 2,314,940 | 3/1943 | Hewitt | 209—127 |
| 2,517,408 | 8/1950 | Olcott | 222—504 X |
| 2,634,842 | 4/1953 | Caylor | 302—59 |
| 2,687,803 | 8/1954 | Johnson | 209—127 |
| 2,691,923 | 10/1954 | Huck | 222—556 X |
| 2,767,844 | 10/1956 | Carpenter | 209—231 |
| 2,814,002 | 11/1957 | Nicholas | 174—99 X |
| 2,971,703 | 2/1961 | Rath | 209—219 X |

FOREIGN PATENTS

| | | |
|---|---|---|
| 719,732 | 12/1954 | Great Britian. |
| 270,594 | 4/1913 | Germany. |
| 501,591 | 1/1927 | Germany. |

HARRY B. THORNTON, *Primary Examiner.*

FRANK W. LUTTER, *Examiner.*

R. HALPER, *Assistant Examiner.*